United States Patent
Belcea

(10) Patent No.: US 7,203,497 B2
(45) Date of Patent: *Apr. 10, 2007

(54) SYSTEM AND METHOD FOR ACCURATELY COMPUTING THE POSITION OF WIRELESS DEVICES INSIDE HIGH-RISE BUILDINGS

(75) Inventor: John M. Belcea, West Melbourne, FL (US)

(73) Assignee: MeshNetworks, Inc., Maitland, FL (US)

(*) Notice: Subject to any disclaimer, the term of this patent is extended or adjusted under 35 U.S.C. 154(b) by 121 days.

This patent is subject to a terminal disclaimer.

(21) Appl. No.: 10/861,557

(22) Filed: Jun. 4, 2004

(65) Prior Publication Data

US 2004/0258013 A1    Dec. 23, 2004

Related U.S. Application Data

(60) Provisional application No. 60/476,167, filed on Jun. 6, 2003, provisional application No. 60/476,232, filed on Jun. 6, 2003, provisional application No. 60/546,942, filed on Feb. 24, 2004.

(51) Int. Cl.
*H04Q 7/20* (2006.01)
(52) U.S. Cl. ............... 455/446; 455/456.1; 455/456.2; 455/456.3; 455/457; 340/825.36; 370/338
(58) Field of Classification Search ..... 455/456.1–457, 455/404.1, 404.2, 446, 426.2; 370/338, 401, 370/328, 254; 701/207, 208; 715/517
See application file for complete search history.

(56) References Cited

U.S. PATENT DOCUMENTS 4,494,192 A    1/1985    Lew et al.

(Continued)

FOREIGN PATENT DOCUMENTS

CA    2132180    3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—George Eng
*Assistant Examiner*—Kamran Afshar
(74) *Attorney, Agent, or Firm*—Randi L. Karpinia; Joseph J. Buczynski

(57) ABSTRACT

A system and method for providing a network of wireless devices including Mobile Terminals, Wireless Routers and a Local Control within a high rise building or other three dimensional deployment structure, such that communication, identification and position calculations can be achieved regardless of environment nature. Mobile Terminals are deployed to assume any random positions within a three dimensional deployment structure. Communication and position calculations are provided at each level, or floor of the building, by Horizontal and Vertical Routers, where Vertical Routers are further used to successfully communicate between levels, or floors. The Vertical Routers provide communication links with the Local Controller via one or more Intelligent Access Points. The infrastructure of Vertical and Horizontal routers, the Intelligent Access Points and the Local Control are elements of an infrastructure deployed before a fire incident or other emergency happens. In emergency situations the infrastructure emerges with ad-hoc deployed elements creating a system that assures stable communication, identification and accurate computation of location for all participants to emergency action.

34 Claims, 9 Drawing Sheets

U.S. PATENT DOCUMENTS

| | | |
|---|---|---|
| 4,617,656 A | 10/1986 | Kobayashi et al. |
| 4,736,371 A | 4/1988 | Tejima et al. |
| 4,742,357 A | 5/1988 | Rackley |
| 4,747,130 A | 5/1988 | Ho |
| 4,910,521 A | 3/1990 | Mellon |
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,392,450 A | 2/1995 | Nossen |
| 5,412,654 A | 5/1995 | Perkins |
| 5,424,747 A | 6/1995 | Chazelas |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayer et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,032,035 A * | 2/2000 | Webster et al. ......... 455/404.2 |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seaholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,366,568 B1 | 4/2002 | Bolgiano et al. |
| 6,370,356 B2 * | 4/2002 | Duplessis et al. ........... 455/447 |
| 6,405,049 B2 | 6/2002 | Herrod et al. |
| 6,449,477 B1 * | 9/2002 | Weissman ................. 455/422.1 |
| 6,463,090 B1 * | 10/2002 | Dorfman .................... 375/131 |
| 6,768,730 B1 * | 7/2004 | Whitehill ................... 370/348 |
| 6,801,753 B1 * | 10/2004 | Keong ........................ 455/3.01 |
| 6,876,951 B2 * | 4/2005 | Skidmore et al. ........... 702/186 |
| 6,885,860 B2 * | 4/2005 | Bahl et al. ................ 455/414.1 |
| 6,895,333 B2 * | 5/2005 | Hethuin et al. .............. 701/215 |
| 6,917,288 B2 * | 7/2005 | Kimmel et al. ......... 340/825.36 |
| 6,980,768 B2 * | 12/2005 | Arend et al. ................ 455/3.01 |
| 7,023,828 B2 * | 4/2006 | Korus et al. ................ 370/338 |
| 7,110,756 B2 * | 9/2006 | Diener .................... 455/456.1 |
| 7,126,951 B2 * | 10/2006 | Belcea et al. ............... 370/400 |
| 7,167,715 B2 * | 1/2007 | Stanforth .................... 455/457 |
| 2001/0053699 A1 | 12/2001 | McCrady et al. |
| 2002/0013856 A1 | 1/2002 | Garcia-Luna-Aceves |
| 2003/0078029 A1 * | 4/2003 | Petite ......................... 455/404 |
| 2003/0104818 A1 * | 6/2003 | Kotzin ....................... 455/456 |
| 2003/0143994 A1 * | 7/2003 | Kimura et al. .............. 455/422 |
| 2003/0214410 A1 * | 11/2003 | Johnson et al. ........... 340/573.4 |
| 2004/0028017 A1 * | 2/2004 | Whitehill et al. ........... 370/338 |
| 2004/0105399 A1 * | 6/2004 | Robertazzi et al. ......... 370/310 |
| 2004/0185822 A1 * | 9/2004 | Tealdi et al. .............. 455/404.1 |
| 2004/0203862 A1 * | 10/2004 | Wood et al. ............. 455/456.1 |
| 2004/0203906 A1 * | 10/2004 | Kato et al. ............... 455/456.1 |
| 2005/0048987 A1 * | 3/2005 | Glass ....................... 455/456.1 |
| 2006/0023681 A1 * | 2/2006 | A'Rafat ...................... 370/338 |
| 2006/0029010 A1 * | 2/2006 | Belcea ....................... 370/310 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |

| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol", no date listed.

Chip Elliott and Bob Heile, "Self-Organizing, Self-Healing Wireless Networks," 2000 IEEE, no month listed.

J.J. Garcia-Luna-Aceves and Asimakis Tzamaloukas, "Reversing the Collision-Avoidance Handshake in Wireless Networks", no month listed.

J.J. Garcia-Luna-Aceves and Marcelo Spohn, "Transmission-Efficient Routing in Wireless Networks Using Link-State Information", no date listed.

J.J Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs", no date listed.

J. R. McChesney and R.J. Saulitis, "Optimization of an Adaptive Link Control Protocol for Multimedia Packet Radio Networks", no date listed.

Ram Ramanathan and Regina Rosales-Hain, "Topology Control of Multihop Wireless Networks Using Transmit Power Adjustment", no date listed.

Ram Ramanathan and Martha E. Steenstrup, "Hierarchially-Organized, Multihop Mobile Wireless Networks for Quality-of-Service Support", no date listed.

Martha E. Steenstrup, "Dynamic Multipoint Virtual Circuits for Multimedia Traffic in Multihop Mobile Wireless Networks", no date listed.

Zhenya Tang and J.J. Garcia-Luna-Aceves, "Collision-Avoidance Transmission Scheduling for Ad-Hoc Networks", no date listed.

George Vardakas and Wendell Kishaba, "QoS Networking With Adaptive Link Control and Tactical Multi-Channel Software Radios", no date listed.

* cited by examiner

SYSTEM AND METHOD FOR ACCURATELY COMPUTING THE POSITION OF WIRELESS DEVICES INSIDE HIGH-RISE BUILDINGS

The present application claims benefit under 35 U.S.C. § 119(e) from a U.S. Provisional Patent Application of John M. Belcea et al. entitled "System and Method for Identifying the Floor Number Where a Firefighter in Need of Help is Located Using Received Signal Strength Indicator and Signal Propagation Time", Ser. No. 60/546,942, filed on Feb. 24, 2004, from a U.S. Provisional Patent Application of John M. Belcea, entitled "System and Method for Accurately Computing the Position of Wireless Devices Inside High-Rise Buildings", Ser. No. 60/476,167, filed on Jun. 6, 2003, and from a U.S. Provisional Patent Application of John M. Belcea, entitled "MAC Protocol for Accurately Computing the Position of Wireless Devices Inside Buildings", Ser. No. 60/476,232, filed on Jun. 6, 2003, the entire contents of each application being incorporated herein by reference.

BACKGROUND OF THE INVENTION

1. Field of the Invention

The present invention relates to a system and method for deploying a network of wireless devices which can provide data for accurately computing the position of mobile network members. More particularly, the present invention relates to a system and method of deploying a network of wireless devices including Mobile Terminals, Wireless Routers and Controllers within a three dimensional deployment structure, such that communication, identification and position calculations can be achieved with high accuracy regardless of the building structure.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications networks known as an "ad-hoc multi-hopping" networks has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated multi-hopping ad-hoc networks are also being developed which, in addition to enabling mobile nodes to communicate with each other as in a conventional ad-hoc network, further enable the mobile nodes to access fixed networks and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

In either conventional wireless communications networks, or in ad-hoc multi-hopping wireless communications networks, it may be necessary or desirable for a mobile node to be capable of knowing or determining a relative or absolute geographic location or position. As known to those skilled in the art, this can be achieved through the use of a number of technologies. These technologies can cell identification, combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. Another available technology uses cellular signal timing based methods for code division multiple access (CDMA) and wideband code division multiple access (WCDMA). Yet another technology uses Global Positioning System (GPS) techniques, which is generally viewed as being more accurate than all other methods listed.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relatively large number of measurements to remove such errors. A description of the shortcomings of GPS is set forth in a document by the Institute For Mathematics and its Applications (IMA) entitled "Mathematical Challenges in Global Positioning Systems (GPS)", the entire content of which is being incorporated herein by reference. Certain other tests also demonstrate that the GPS technique is unsuitable for those terrestrial-based networks operating in environment where the number of available satellites is too small for providing good precision as in underground tunnels, inside buildings, under dense foliage or in urban "canyons".

To overcome the above issues with determining location information, are being developed ad-hoc multi-hopping networks which do not require either the use of satellites or a centralized computing facility for determining location information. Further details of such ad-hoc networks are described in U.S. Pat. No. 6,728,545 entitled "System and Method for Computing the Location of a Mobile Terminal in a Wireless Communications Network", the entire contents of which is incorporated herein by reference. Additionally, ad-hoc networks can be developed utilizing non-fixed, or movable infrastructure components. Further details of networks using movable access points and repeaters for minimizing coverage and capacity constraints are described in U.S. patent application Ser. No. 09/929,030 entitled "Movable Access Points and Repeaters for Minimizing Coverage and Capacity Constraints in a Wireless Communications Network and a Method for Using the Same", filed Aug. 15, 2001, the entire content being incorporated herein by reference.

The documents discussed above generally relate to mobile networks that connect to a permanent fixed network where location information is presented as absolute locations. However, as can be appreciated from the patent applications referenced above, temporary ad-hoc networks do not necessarily have the same requirements. Therefore, a need exists for a portable, easily deployed, self-contained ad-hoc network system where relative location detection is desired, such as where the location of personnel operating in emergency condition is critical. The relative location may be provided in addition to, or in replacement of absolute geo-location, and should be readily communicable between and among various transmission obstacles typically present in such location.

Accordingly, a need exists for an improved system and method for easily determining and communicating the absolute and/or relative location of a mobile node in a deployed wireless communications network.

SUMMARY OF THE INVENTION

An object of the present invention is to provide a system and method for deploying a network of wireless devices, including Mobile Terminals, Wireless Routers and Controllers, within a three dimensional deployment structure such that communication, identification and position calculations can be achieved regardless of building structure.

Another object of the present invention is to provide a system and method of Vertical Routers to support communication between floors in a three dimensional building deployment structure.

Another object of the present invention is to provide a system and method of Horizontal Routers to support communication between Mobile Terminals on each floor in a three-dimensional deployment structure.

Another object of the present invention is to provide a system and method of Intelligent Access points to support communication between Routers and one or more Controllers in a three-dimensional deployment structure.

Another object of the present invention is to provide a system and method for testing the operational deployment of Mobile Terminals, Vertical and Horizontal Routers and Intelligent Access Points in a three dimensional deployment structure.

Another object of the present invention is to provide a system and method for downloading, maintaining and updating a map database of a three dimensional deployment structure.

These and other objects are substantially achieved by providing a system and method for deploying a network of wireless devices including Mobile Terminals, Wireless Routers and Controllers within a three dimensional deployment structure, such that communication, identification and position calculations can be achieved regardless of building structure. Mobile Terminals are deployed to assume any number of random positions within a three dimensional deployment structure. Communication and position calculations are provided at each level, or floor, by Horizontal and Vertical Routers, where Vertical Routers are further used to successfully communicate between levels, or floors. The Vertical Routers provide communication links with Local Controllers via one or more Intelligent Access Points.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below each include a system and method for accurately computing the position of wireless devices in a three-dimensional network, such as a network distributed throughout a high-rise building using specific nodes, such as wireless routers. The system and method described below can provide very precise indoor location of mobile devices, such as MEA™ devices, that are located in three-dimensional networks. The functionality of the system and method is broader than a communication system having location capabilities, and serves primarily as a location system with communications capabilities. This allows the embodiments described below to incorporate predefined routing, which almost eliminates the need for exchanging routing messages, while supporting the exchange of a very large number of location specific messages that contributes to the increased precision of computation.

As noted above, the location of personnel operating in emergency conditions is very important for many reasons. There have been cases when personnel, such as firefighters, are lost in smoke and become confused about the real position of themselves or others on the present or previous floors they were operating. The system and method described below is presented as one embodiment which is configured for supporting the operation of firefighters. In yet another embodiment of the present invention, the system and method can be configured for supporting the activity of any number of other emergency or Special Forces deployments.

Figure 1:
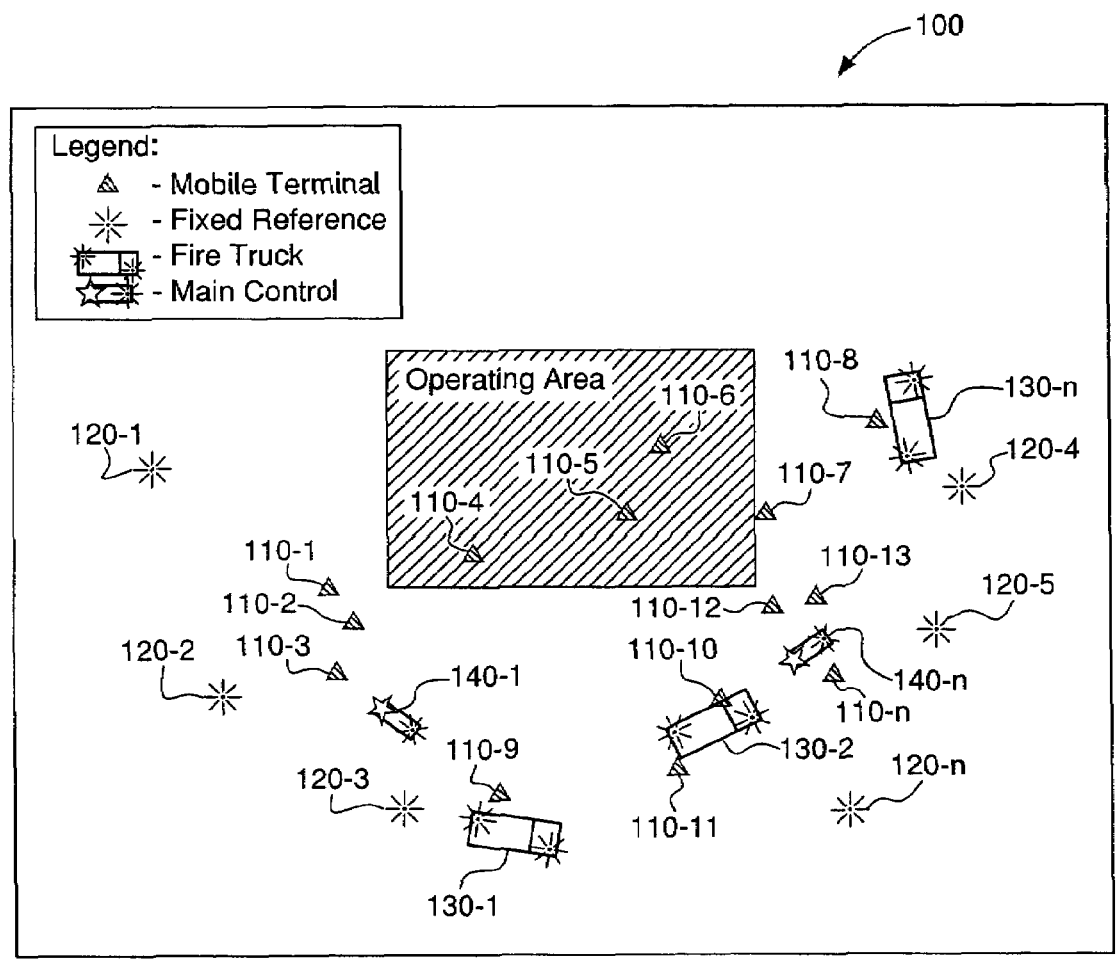
FIG. 1 is a top view diagram of an example of ad-hoc wireless communications network including a plurality of nodes in accordance with an embodiment of the present invention deployed within and around an operating space when an emergency occurs.
Figure 2:
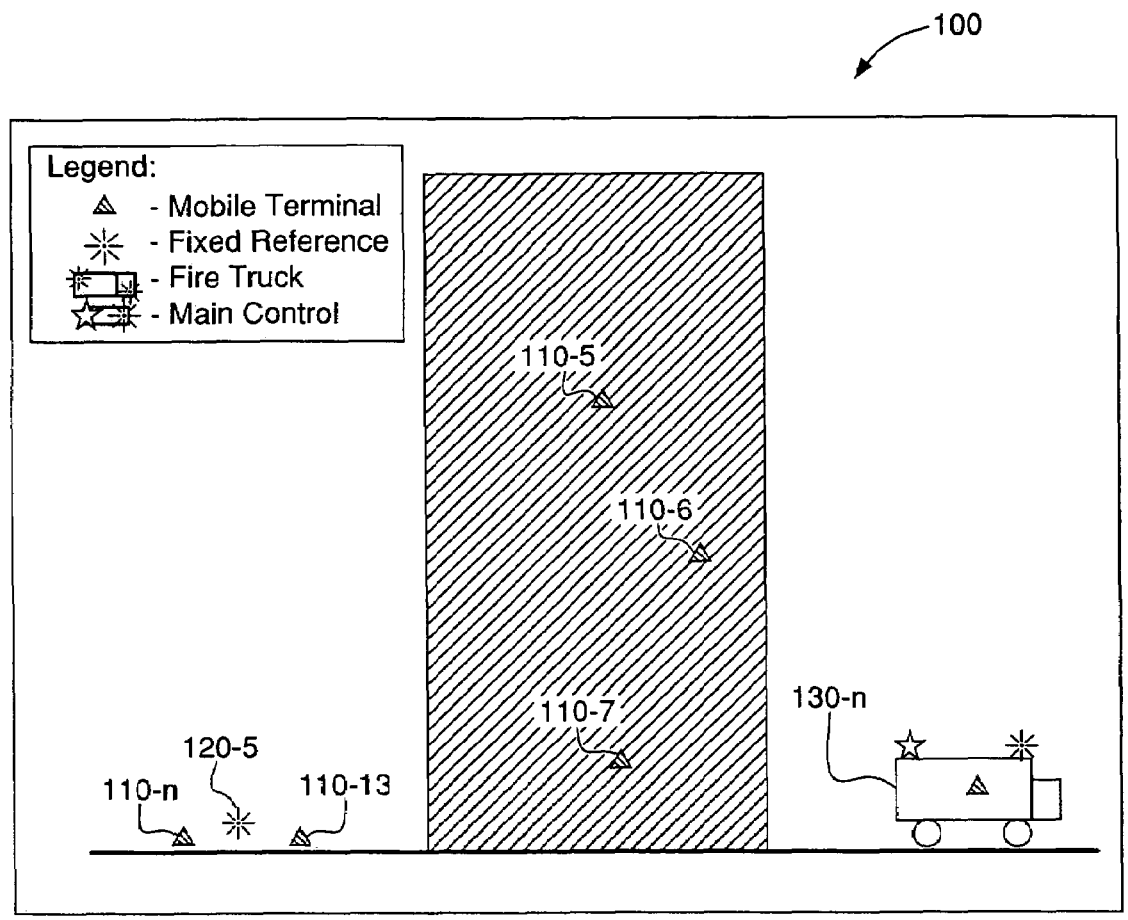
FIG. 2 is a side view diagram of an example of the network of FIG. 1, illustrating the three-dimensional positioning of communication elements in accordance with an embodiment of the present invention deployed within and around an operating structure when an emergency occurs.

A network configuration for use with an embodiment of the present invention is shown in FIGS. 1 and 2. FIG. 1 is a top view block diagram of an example ad-hoc wireless communications network including a plurality of nodes in accordance with an embodiment of the present invention. FIG. 2 is a side view diagram of the network of FIG. 1, illustrating the three-dimensional positioning of communication elements.

Figure 3:
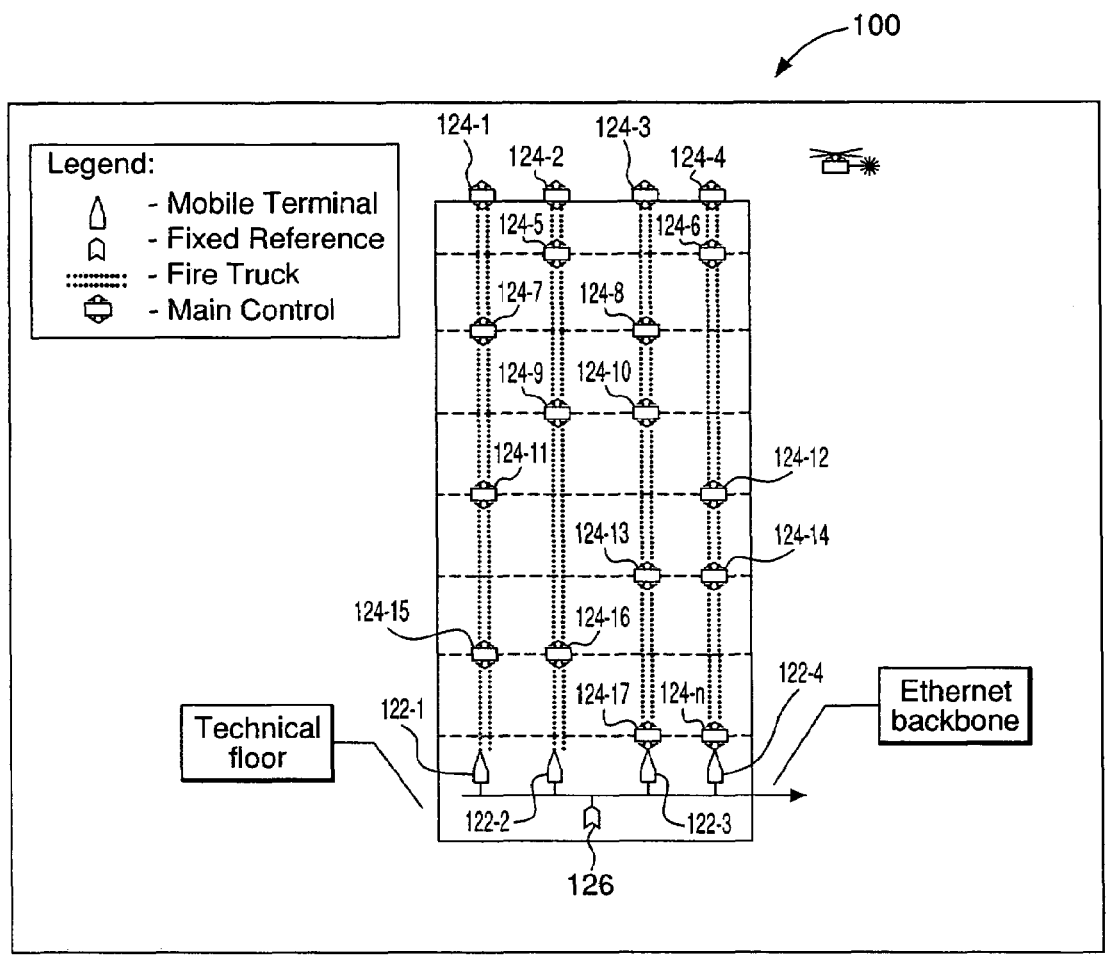
FIG. 3 is a side view diagram of an example of a network deployed as vertical infrastructure in accordance with an embodiment of the present invention.
Figure 4:
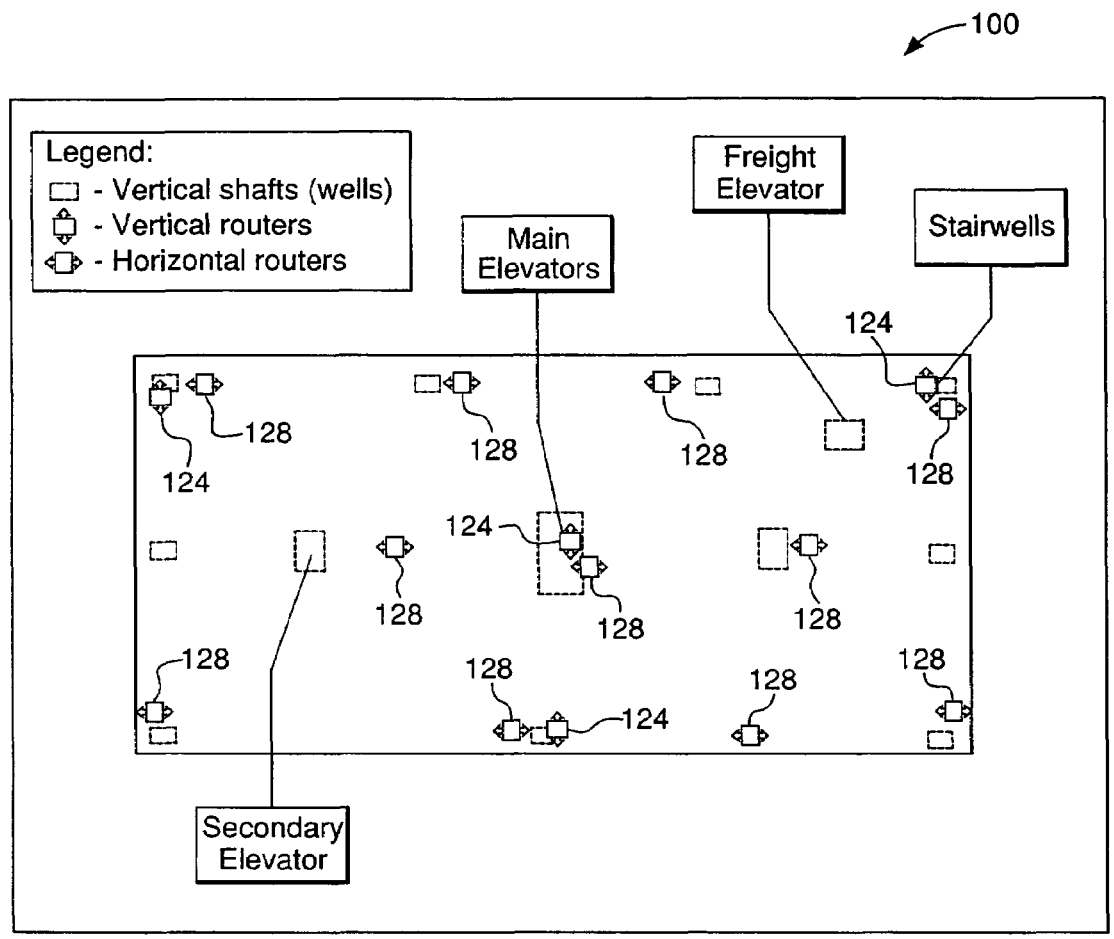
FIG. 4 is a top view diagram of an example of a network deployed as horizontal infrastructure in accordance with an embodiment of the present invention on a particular floor of the building.

FIGS. 1 and 2 show the mobile elements that can be brought to the scene because of the fire incident. FIGS. 3 and 4 show infrastructure elements (i.e. vertical routers, IAP devices Local Control and Internet Backbone) that were installed in the building long before the fire. FIG. 3 shows vertical infrastructure of VR devices with IAP devices at the bottom of each well connected through cables to Local Control. FIG. 4 shows horizontal routers deployed on the same floor.

As shown in FIG. 1, a wireless network deployed at a fire incident 100 includes a plurality of terminals, including Mobile Terminals 110-1 to 110-n, which are typically associated with firefighters, Fixed References 120-1 to 120-n, fire trucks 130-1 to 130-n, and Main Controls 140-1 to 140-n. FIG. 1 illustrates a top view of a typical fire operation deployment and illustrates the random position each device may assume when arriving at the scene. The deployment operating area can be flat, or, a residential or business building with reduced number of floors, or a high-rise building including an extensive number of floors with passages between floors. The example described below is configured to illustrate an embodiment which supports fire operations in such a high-rise building, including floors and between floor passages, however additional embodiments can be configured to support operations in other operating environments.

FIG. 2 shows a side view of wireless network deployed at the fire incident of FIG. 1. In the example shown in FIGS. 1 and 2, personnel, such as firefighters, can be operating outside and/or inside a building at various floors. If a situation becomes critical, or if one firefighter is injured, it is important to identify the correct location of the personnel, and provide correct directions to the rescue team for preventing fatalities.

Each element 110, 120, 130 and 140 of FIGS. 1 and 2 can include at least one of three types of wireless devices that exchange data for computing the location of each operator, while also supporting voice communications. Elements 110, 120, 130 and 140 can be comprised of one or more Mobile Terminal (MT) devices, Fixed Reference (FR) devices (i.e. Intelligent Access Points, Vertical and Horizontal Routers, and Fixed References), and Control devices (i.e. Local Controllers, and Main Controllers). Each of these devices are migratory and can be brought to the operating scene when they are needed.

The system and method of the embodiment described below employs these Mobile Terminals, Intelligent Access Points, Local Controllers, Vertical Routers, Horizoinal Routers, Fixed References and Main Controllers where each typically contains at least one transceiver, or modem, adapted to transmit and receive communication signals to and from other wireless devices, and are capable of communicating with each other directly, or via one or more other devices operating as a router or routers for packets being sent between nodes, as described in U.S. Pat. No. 5,943,322 to Mayor and in U.S. patent applications Ser. No. 09/897,790, and U.S. Pat. Nos. 6,807,165 and 6,973,839, referenced above.

A vertical deployment example of fixed infrastructure is shown in FIG. 3. FIG. 3 shows a deployment of the "vertical" infrastructure in accordance with an embodiment of the present invention in a high-rise building, and includes a number of Intelligent Access Points (IAP) 122-1 to 122-n, and a system of Vertical Routers (VR) 124-1 to 124-n, dispersed among a number of floors of an example building. As described above, IAP 122 are wireless devices capable of communication through radio frequencies that have a network interface. Through that interface, the IAP are connected to a Local Control (LC) 126 that handles the information regarding the whole system.

Due to the fact that radio signal penetration is almost impossible through the concrete floors in the example building, a system of Vertical Routers 124-1 to 124-n is used to achieve communication between the Local Control and each floor of the building. For providing redundancy in case of catastrophic events and for increased precision of mobile position calculations, in one embodiment of the present invention, at least two Vertical Routers 124 can be deployed on each floor and located in or close to different vertical shafts, as far as possible one from another.

The Vertical Routers 124 are installed in or at any vertical openings (i.e. wells) of the building, such as elevator shafts, stairwells, air conditioning vertical conduits, and so forth, and typically will have very reliable communication with the closest neighbor device. Vertical Routers installed on the roof of the building in or at the top of each well assures redundant connection between wells or to Wireless Routers beyond the building, such as in Fire Department, Police Department aircraft or similar devices located on neighboring buildings. In yet another embodiment of the present invention, Vertical Routers can also be installed on the exterior walls of the building and disguised as architectural features. In FIG. 3, the system of several Intelligent Access Points 122 assure the connection of the entire system of vertical routers VR to the Local Control of the system, which can be located on the technical floor of the building.

FIG. 4 is a view diagram of an example of the network deployed on a floor and illustrating the "horizontal" infrastructure in accordance with an embodiment of the present invention. In this diagram are presented a number of Vertical Routers (VR) 124-1 to 124-n, and Horizontal Routers 128-1 to 128-n, dispersed across a single floor of an example building.

In the example floor shown in FIG. 4, the connection with the vertical infrastructure is assured through three Vertical Routers 124 located at the North-West, North-East and South stairwells, and in the main elevator shafts. On this floor, eight Horizontal Routers are deployed along the walls of the building, while at least three others are positioned in a central area within the outer walls.

Due to the fact that stairwells can have concrete walls that create high signal attenuation, a Horizontal Router 128 is installed close by each Vertical Router 124. This proximity assures that the two radios, or Routers 124 and 128, can reliably communicate with one another. The number and the deployment plan of the Horizontal Routers 128 typically depends upon the materials used in the interior walls, and the number of walls, at each floor of the building. Generally, at any point on the floor, a Subscriber Device (i.e. mobile station or Mobile Terminal) should be able to communicate with multiple Routers, preferably with at least three Routers.

The equipment comprising and providing the functionality of the Vertical and Horizontal Routers 124 and 128 is very small, and therefore can be installed at convenient locations within the building, such as inside EXIT signs or other emergency equipment typically configured to run on batteries and therefore provide service in emergency situations during the outage of the main source of power.

In case of a fire incident, the elements presented in FIG. 1 and FIG. 2 are deployed on the scene. The communication between the pre-deployed system of Intelligent Access Points 122, Vertical Routers 124, Local Control 126, and Horizontal Routers 128, present inside the building and the Main Control just deployed outside the building is possible through several connections. When the Main Control arrives at an emergency scene, or scene, it can connect to the building system through a wired Ethernet Backbone typically found in building support systems. If the Ethernet Backbone is disabled, the Main Control can tap into the building system using wireless connection to the Horizontal Routers 128 located close to the windows on the lower floors of the building. Using a high gain directive antennae, the Main Control can get reliable connection several floors up if the routers are installed close to the windows. If such a connection is not possible, the Main Control can tap into the building system relaying through flying routers installed on Police or Fire Department aircraft. In yet another embodiment, the Main Control may be able to tap into the building communication system while connecting through a neighboring building, if the neighbor buildings are close enough and the same type of wireless communication infrastructure has already been deployed. Such a connection would typically be used only if no other alternative works, as this connection cannot provide very high data throughput. The message routing mechanism installed in MEA™ assures the automatic selection of the most efficient way of tapping into the building infrastructure. When deciding which path to use, the message routing mechanism takes in consideration all available means and selects the one providing the highest throughput.

Figure 5:
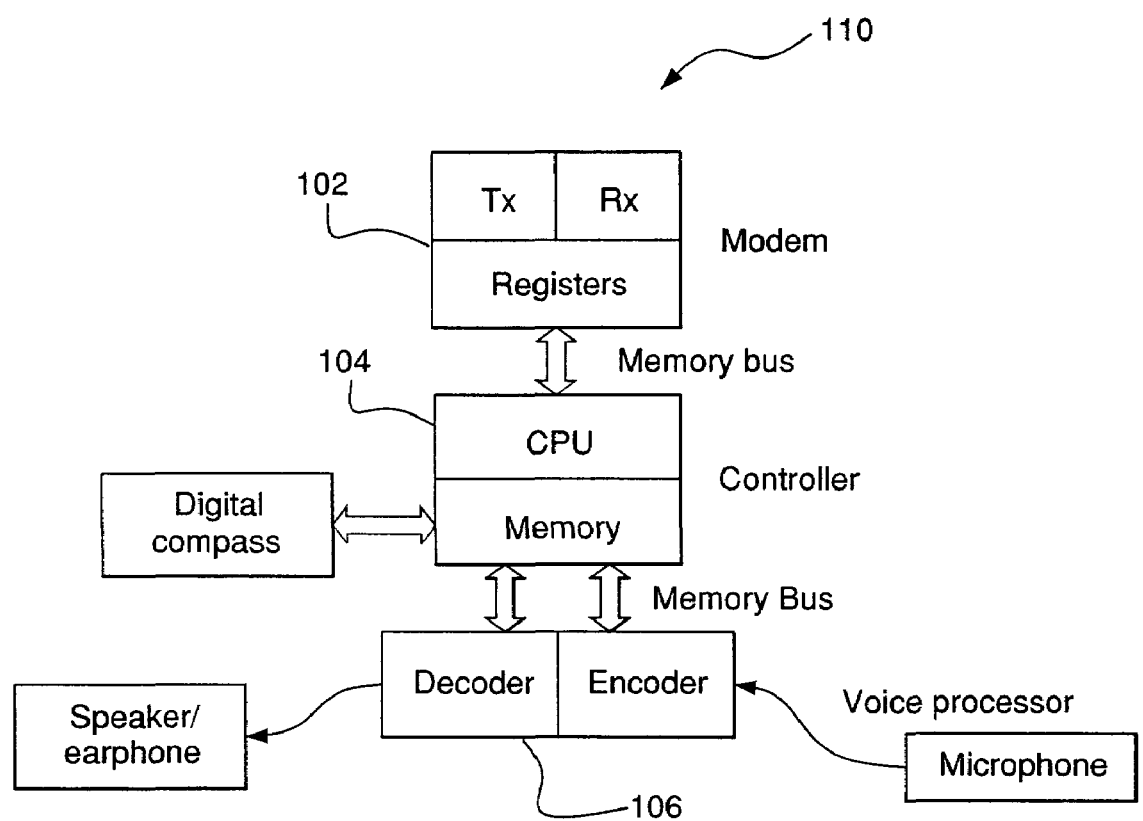
FIG. 5 is a block diagram illustrating an example of the functional structure of a Mobile Terminal used in the network shown in FIG. 1.

As noted above, each element 110, 120, 130 and 140 of FIGS. 1 and 2 can include at least one of three types of wireless devices that exchange data for computing the location of each operator, while supporting voice communications. Elements 110, 120, 130 and 140 can be comprised of one or more Mobile Terminal (MT) devices, Fixed Reference (FR) devices (i.e. Intelligent Access Points, Vertical and Horizontal Routers, and Fixed References), and Control devices (i.e. Local Controllers, and Main Controllers). As shown in FIG. 5, the Mobile Terminal 110 can include a headset with microphone and earphone assuring hand-free operation. A digital compass can also be included for providing orientation and a motion sensor that can trigger an alarm when the firefighter became motionless. All these devices can be connected to the battery that is part of typical operator gear.

The microphone and the earphone of the Mobile Terminal can be connected to a small size transceiver that has three major components, including a Modem 102, a Controller 104 and a Voice Processor 106. The Modem 102 provides radio communication with other components of the network using a transmitter and a receiver. The operation of the transmitter and receiver is controlled by storing appropriate data and code in a memory organized as a set of registers. The receiver and transmitter use the memory registers for providing feedback about the Modem status and the result of executed functions. A Controller 104 is shown coupled with the Modem 102 via a memory bus. The Controller includes 104 a CPU and memory for storing data and the code of the program controlling the modem functions. This controls the Modem 102 activity by writing data in Modem registers via the memory bus, and reading Modem registers for finding the Modem status. A Voice Processor 106 is coupled with the Controller 104, and includes at least two independent components, an Encoder and a Decoder. The Encoder converts the sound received by microphone into a string of numbers, and the Decoder converts the string of numbers back into sound, that is sent to a speaker or earphone. In the embodiment shown in FIG. 5, the Voice Processor 106 further includes access to the Controller Memory via a memory bus. Additionally, a Digital Compass (not shown) can be incorporated into the headset. This provides the orientation of the operator's head when properly positioned, making possible the elaboration of directions using angles relative to operator current position (i.e. "twenty feet at 2 o'clock"). A motion sensor (not shown) can also be incorporated with the transceiver. It can automatically report if the firefighter does not move for some period of time. A push button can be also incorporated with the same effect as the motion sensor. The firefighter can push the button if he needs help. The action of pressing the button is transmitted to the transceiver software that generates a set of data messages for the Main Control. When receiving these messages the Main Control alerts the Incident Commander indicating which firefighter needs help and where the firefighter is currently located The software recorded in the Controller Memory as program code and operating parameters control the activity of all components of the Mobile Terminal device.

Figure 6:
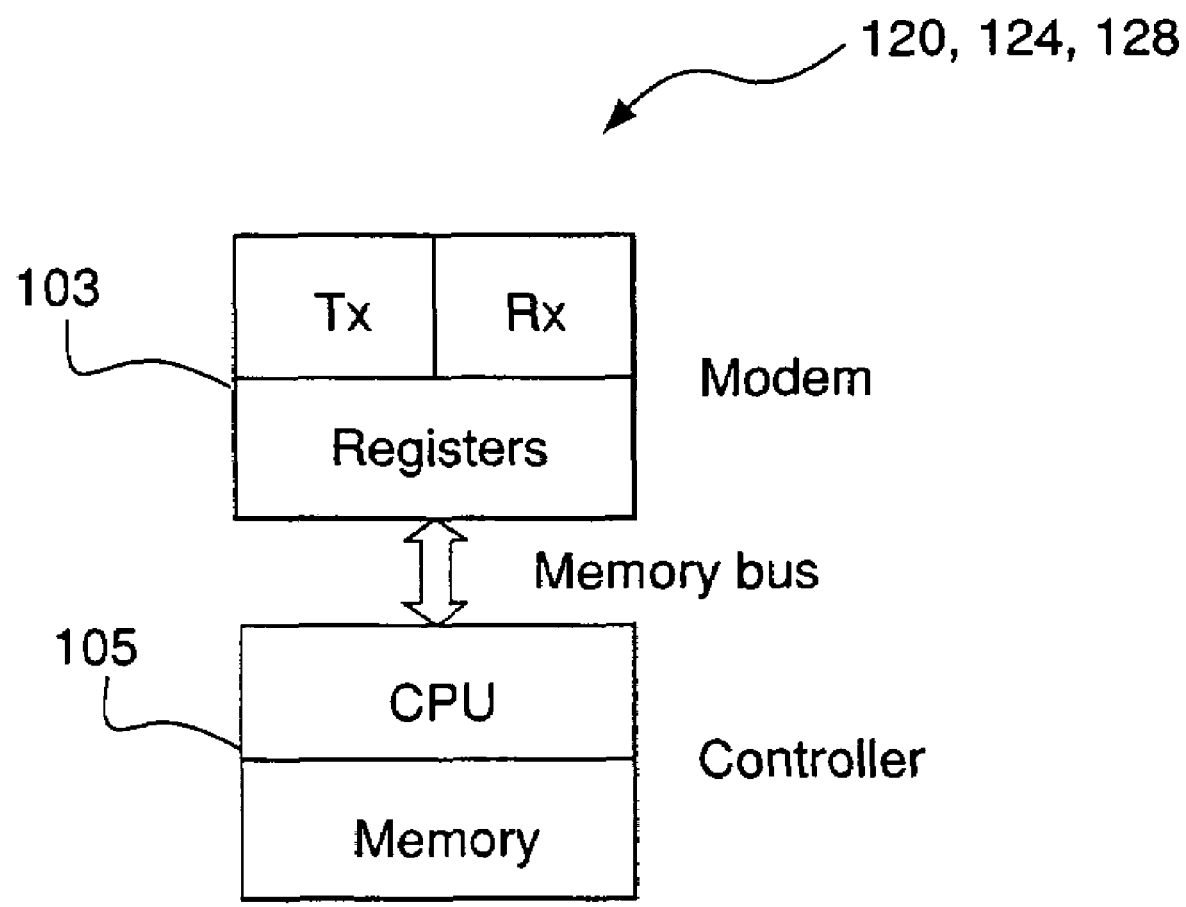
FIG. 6 is a block diagram illustrating an example of the functional structure of a Router and a Reference used in the network shown in FIG. 1.

The Vertical and Horizontal Routers 124 and 128, and Fixed Reference Points 120 shown in FIG. 6, can have the same internal hardware structure, but should operate in different conditions and provide similar functionality. The main function of these types of equipment is to provide location reference for computing the position of Mobile Terminals, and to relay voice and location data to the Main Control. Fixed Reference devices can be installed on each fire truck or other emergency vehicle, and on the side of equipment, such as extendable ladders. They can also be installed on tripods, and placed around the incident area in random positions acting as portable devices. Once deployed, they can configure themselves and provide Location Reference for Mobile Terminals operating in their proximity. The Intelligent Access Points can be installed on the technical floor of the building, and be connected to the Vertical Routers between the technical floor up to the roof.

Fixed Reference devices can be installed on each fire truck or other emergency vehicle, and on the side of equipment, such as extendable ladders. They can also be installed on tripods, and placed around the incident area in random positions acting as portable devices. Once deployed, they can configure themselves and provide Location Reference for Mobile Terminals operating in their proximity.

The Intelligent Access Points can be installed on the technical floor of the building, and be connected to the Vertical Routers between the technical floor up to the roof.

An exemplary block diagram of components of Vertical and Horizontal Routers 124 and 128, and a Fixed Reference 120 is shown in FIG. 6. Because each Vertical and Horizontal Router, and Fixed Reference communicates through radio means, Routers and References have at least one modem 103 and a controller 105, each executing almost the same functions as they do in the Mobile Terminal device described above. Each router in the network exchanges timing and data messages with the Mobile Terminal, Main Control and other Routers and References. Although the hardware components are the same, the software controlling the activity of these devices may be different, as these devices provide different services to the network.

Figure 9:
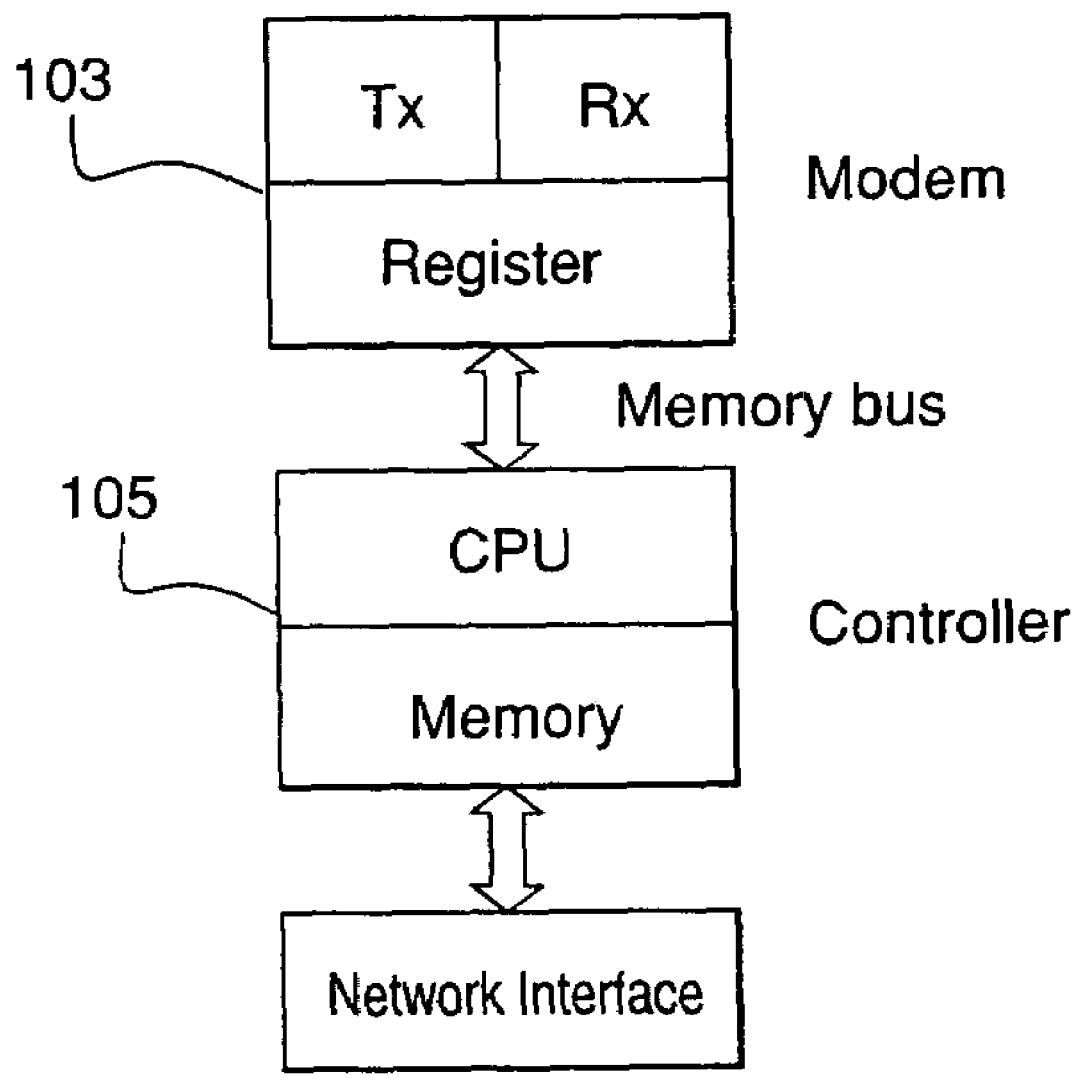
FIG. 9 is a block diagram illustrating an example of an Intelligent Access Point used in the infrastructure shown in FIG. 3

An exemplary block diagram of components in Intelligent Access Points is shown in FIG. 9. Because each IAP communicate with Vertical Routers through radio means, each IAP has at least one modem 103 and a controller 105, executing almost the same functions as they do in the Mobile Terminal device described above. The IAP has also a Network Interface that is used for communication with the Local Control, with other IAPs, with the Main Control or with other networks as Internet.

The Local Control 126 is a computing system, typically installed in the technical floor of the building and contains a database with the position of each Vertical and Horizontal Router and Intelligent Access Point installed in the building. Periodically it exchanges information with each one of them for testing purposes. If any device becomes out of order, the Local Control issues a repair order indicating the faulty device. Once a new device is installed, the Control can perform a device configuration and periodic testing.

Figure 7:
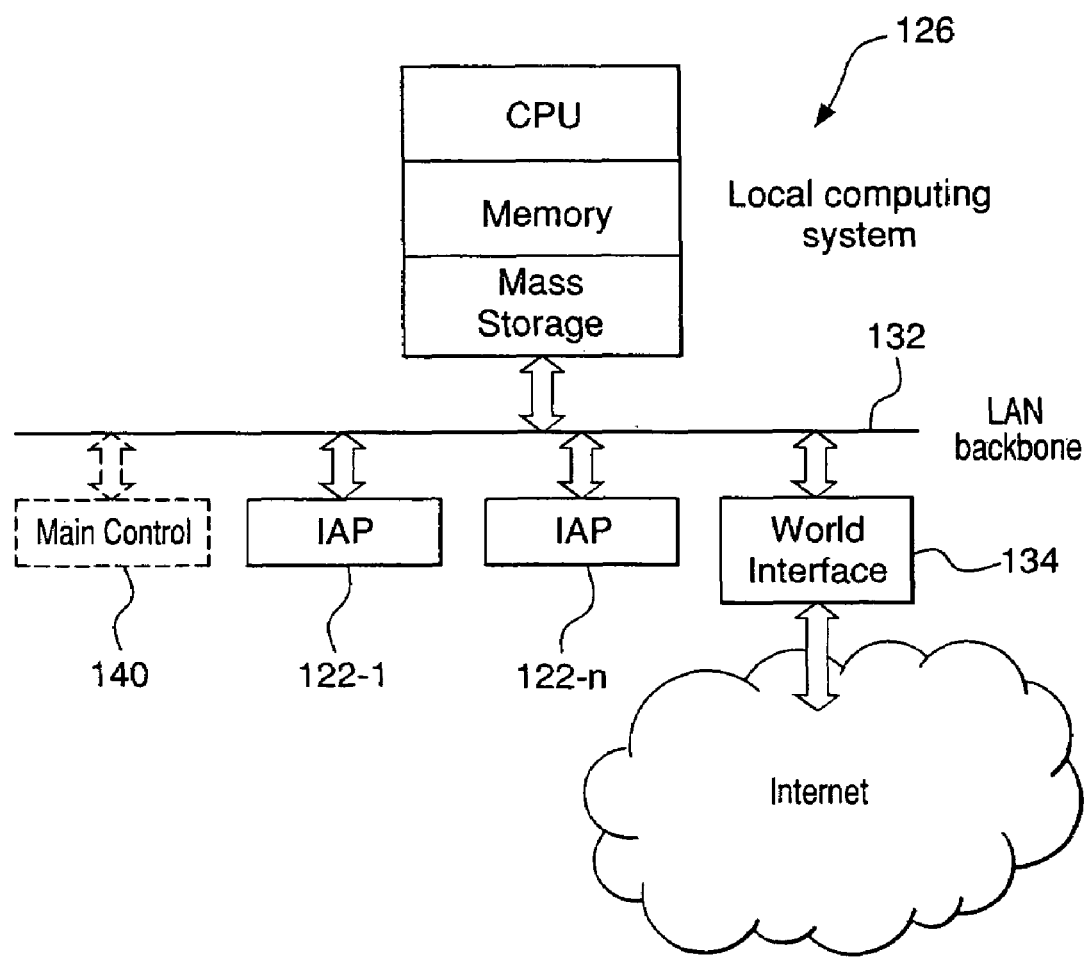
FIG. 7 is a block diagram illustrating an example of Local Control coupling used in the network shown in FIG. 1.

In the embodiment shown in FIG. 7, the Local Control 126 is connected to Intelligent Access Points 122 using a Local Area Network (LAN) 132. The Intelligent Access Points assure further communication to the wireless system. When first installed, the Local Control 126 is "fed" with information, such as building maps describing the location of each room in the building. Every time the layout of a floor is changed, the new map is stored in Local Control hard drive. Where a situation exists, requiring operation of the system and method described above, such as in case of fire, after the connection with the Main Control is established, the Local Control 126 downloads to Main Control 140 the building map database. Using this database the Main Control 140 can identify the floor, the room, and the position of a specific Mobile Terminal 110 inside the room, when such information is needed.

The World Interface 134 assures the connection of the Local Control 126 with the rest of the world through external communications, such as the Internet. It may also allow the Local Control 126 to download databases to the Main Control 140 before the fire happens or while Main Control is moving toward the fire scene, using wireless Internet access.

Figure 8:
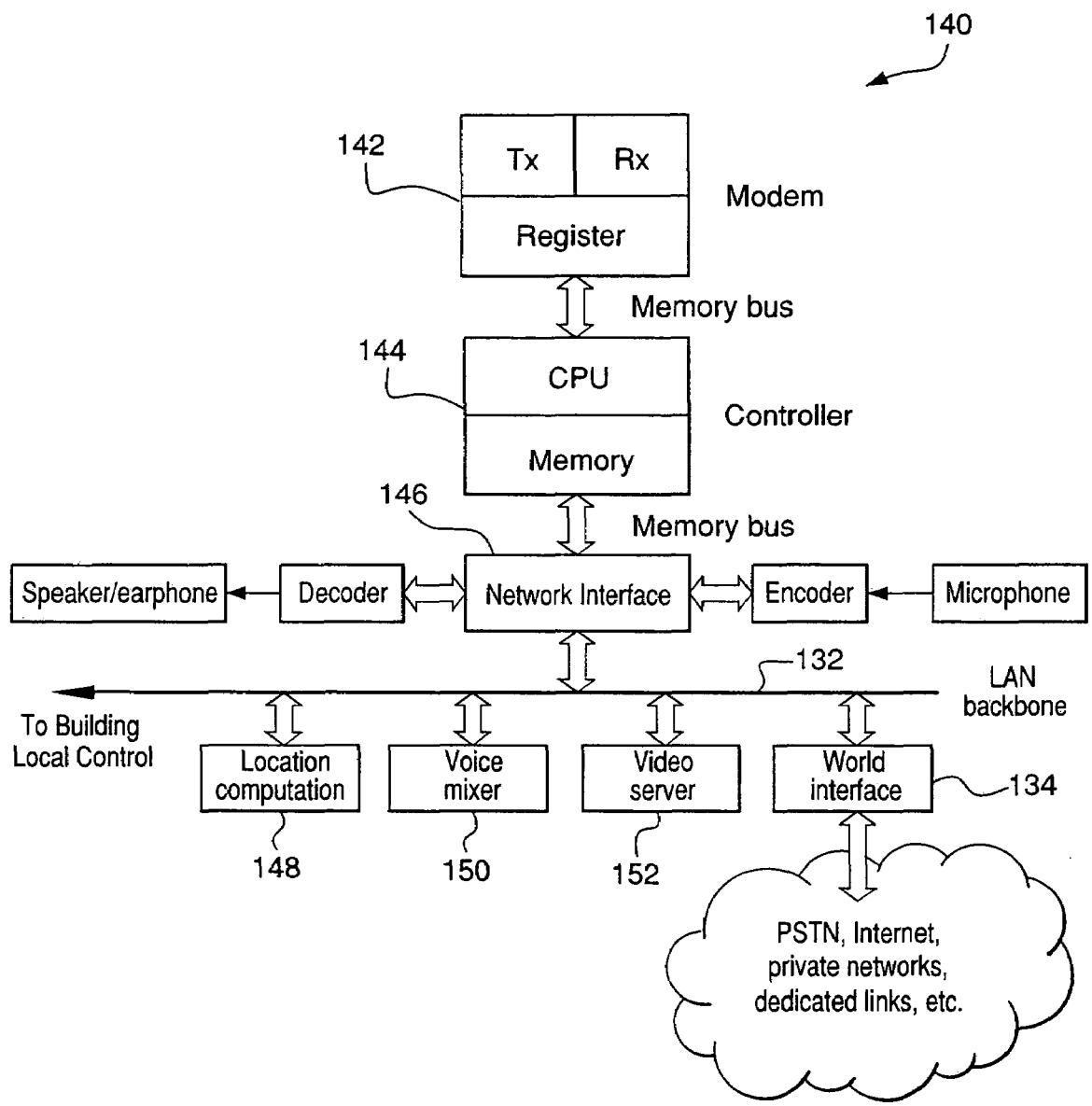
FIG. 8 is a block diagram illustrating an example of Main Control coupling used in the network shown in FIG. 1.

The Main Control (MC) 140 shown in FIG. 8 is the primary control of the system during an emergency, and serves to coordinate the access to airwaves of all terminals and performs all mathematical operations for computing the position of all Fixed Routers and Mobile Terminals. The Main Control equipment may be installed on a vehicle, such as a van or truck, that also hosts one or more Fixed Routers. The antenna of the Main Control can serve as an origin of coordinate in the measurement and positioning calculations.

FIG. 8 is a block diagram illustrating the components of the Main Control 140, and includes a Modem 142 and a Controller 144 performing the same basic functions as for other devices described above, specifically, transmitting and receiving messages over the air. A Network Interface (NI) 146 is provided and operates as the interface between the transceiver and the applications running on the Location Computation 148 and Voice Mixer 150. The Network Interface 146 functions to retrieve data from the Controller Memory and dispatch it to the other components of the system. The Network Interface 146 also serves to receive data from the Voice Mixer 150 and store the packets in the Controller Memory. The communication between the Controller 144 and the Network Interface 146 is realized via a memory bus. On the other side, the communication between the Network Interface 146 and applications is realized through various network sockets.

A Location Computation device 148 is coupled to the LAN backbone 132 and can be a very fast computer (i.e. a PC having 1 GB of memory and at least one CPU running at 3.5 GHz or faster). This component of the system receives data from the Network Interface 146 and computes the clock corrections, propagation times and the location of each Fixed Router and Mobile Terminal using specific mathematical models as the one described in U.S. Pat. No. 6,728,545, referenced above.

A Voice Mixer 150 is also coupled to the LAN backbone 132 and serves to mix voice data as defined by the operator. The GUI of the Voice Mixer shows a matrix with the Main Control and all Mobile Terminals involved in operation. Using this interface, the operator can define the groups of Mobile Terminals that should hear each other. The Voice Mixer 150 creates new sound data packets from received data mixing voice data according to the mixing matrix. All mixed packets are transmitted to the Network Interface 146, that moves them to the Controller memory. The Controller transmits voice data at a particular time during the communication cycle.

A Video Server 152 is also coupled to the LAN backbone 132 and provides the control of various display screens provided for displaying information. This shows three views in two dimensions (i.e. front, side and top) and one view in three dimensions (i.e. isometric) with rotation capability. The Video Server 152 receives the location of each Mobile Terminal and Fixed Router from the Location Computation system that transmits such information at a rate of at least once per second.

The World Interface 134 provides the interface between the LAN backbone 132 with other wired or wireless networks as PSTN, Internet, Private Networks, Dedicated Links, and so forth. One of the remaining sockets of the LAN Backbone 132 is reserved for connecting the Main Control to the Local Control.

The system and method of the present embodiment operates in several phases, as described in greater detail below. Such phases include, but are not limited to, an initial construction phase, an installation phase, a testing phase, a pre-operation phase, and an operating phase.

During the construction phase, the system and method is installed as part of the fire prevention and signaling system. In the example described above, at least four Intelligent Access Points can be installed in the bottom of vertical shafts in the building for assuring the communication through the building floors. Horizontal Routers can be installed on each floor and provide communication on each floor and serve also as Location References. The Horizontal Routers are installed in such positions that at any location on the floor, a Mobile Terminal can exchange data with at least three Horizontal or Vertical Routers. For assuring higher precision of the computation of Mobile Terminal location as well as for assuring a high redundancy of the network, the number of Horizontal Routers a Mobile Terminal should be able to exchange messages with should be at least three, with no upper limit.

During the installation phase, the Routers database is loaded with the position (i.e. floor, x, y, and so forth) of each Horizontal and Vertical Router. In the same phase, the building maps are loaded in the Building database. In this database, all confinements, such as all walls on each floor of the building are noted. The positions of the Routers and walls are in the same system of coordinates. All these databases are installed in the Local Control hard drive and are accessed when Main Control arrived at the scene.

After the installation phase is complete, the correctness of the database is checked during a testing phase. The coverage test consists of moving a Mobile Terminal across each floor in the building. The position of the Mobile Terminal must be observed on a portable computer that shows the right floor map and the correct position of the Mobile Terminal. In the preferred embodiment, all Wireless Routers must be involved in this test. The Local Control records a log of Mobile Terminal computed locations and the Horizontal Routers used for computing these locations. If any Router was not used during the test, a new test is started in the location of the missed Routers.

When the Main Control cable is connected to the Local Control, the contents of the building databases are downloaded during a pre-operating phase. The map database is downloaded to the Video Server, while the Floor Height is downloaded to Location Computation.

During the operating phase, the Local Control collects range, valve and direction data from each Mobile Terminal in, and around, the building and transmits such data to the Location Computation and Voice Mixer for processing. The Video Server displays the front, side and top view of the involved Mobile Terminals and the maps of specified floors with Mobile Terminals operating on them. The Mobile Terminals can determine their respective locations using algorithms such as those described in U.S. Patent Application of John M. Belcea et al. entitled "System and Method for Identifying the Floor Number Where a Firefighter in Need of Help is Located Using Received Signal Strength Indicator and Signal Propagation Time", Ser. No. 10/861,121, filed on Jun. 4, 2004, the entire content of which is incorporated herein by reference. For instance, to improve accuracy, the Mobile Terminals can use Time of Flight (TOF) data and Received Signal Strength Indicator (RSSI) data and a scoring process to identify the correct floor on which they are located. MAC protocol techniques can also be used to improve the accuracy of the location determination, as described in U.S. Patent Application of John M. Belcea entitled "MAC Protocol for Accurately Computing the Position of Wireless Devices Inside Buildings", Ser. No. 10/861,668, filed on June 4, 2004, the entire content of which is incorporated herein by reference.

The method and system presented in this invention have the advantage to present an accurate depiction of the routers in large buildings are affected by catastrophic events like fire or terrorist attack. When such event happens, some of the Vertical and Horizontal Routers could stop functioning. The Main Control screens show the images of the operating and dead routers, allowing correct evaluation of affected building zones and selection of evacuation routes.

In the embodiments of the present invention described above, the system and method provides accurate position of the mobile network members and allows voice exchange between members of the team involved in operation. Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A system for deployment within a three-dimensional structure having multiple levels, the system comprising:
a plurality of wireless routers of a wireless ad-hoc multi-hopping and peer-to-peer communication network, the plurality of wireless routers comprising:
a plurality of vertical routers deployed for vertical communication among at least one set of vertical routers within the three-dimensional structure, and
a plurality of horizontal routers deployed for horizontal communication among at least one set of horizontal routers within the three-dimensional structure;
a plurality of mobile wireless terminals of the wireless ad-hoc multi-hopping and peer-to-peer communication network;
a controller;
at least one access point, communicatively coupled to the wireless routers and mobile wireless terminals for providing communication access to the controller;
each of the mobile wireless terminals comprising:
a receiving means, for receiving signals with any of the routers within its broadcast range,
a location calculation means, for determining its respective location in the structure based on the received signals, and
a transmitting means for providing location data to the controller via at least one said wireless router and said at least one access point; and
the controller comprising:
means to access a database including structure layout data pertaining to the structure, and
information generation means for generating information representing the respective locations of the mobile wireless terminals in the structure based on the received location data and structure layout data.

2. A system as claimed in claim 1, wherein:
the controller further comprises a display for displaying the generated information illustrating the layout of the structure and the respective locations of the mobile wireless terminals on the layout display.

3. A system as claimed in claim 1, wherein:
the controller further comprises a receiver to receive router location data from the wireless routers and access point location information from the at least one access point, wherein the generated information includes information representing respective locations of the wireless routers and said at least one access point.

4. A system as claimed in claim 1, further comprising:
a plurality of said access points; and
wherein the structure is a multi-floor building, wherein one or more of the vertical routers are in substantial vertical alignment at openings in the floors to provide communication between one or more horizontal routers on the floors and the access points.

5. A system as claimed in claim 1, wherein:
the controller further comprises a receiver to access the database for updated structure layout data pertaining to the structure, and wherein the generated information is based on the received location data and the updated structure layout data.

6. A system as claimed in claim 1, wherein the location calculation means of each of the mobile wireless terminals performs ranging calculations based on the exchange signals with any of the routers within its broadcast range and determine its respective location based on those ranging calculations.

7. A system as claimed in claim 1, wherein:
each of the mobile wireless terminals further comprises a transmitting means to communicate at least one of voice, video and data information for receipt by the controller via at least one wireless router and said at least one access point.

8. A system as claimed in claim 1, further comprising:
a mobile controller, communicatively coupled to the controller to receive the generated information from the controller.

9. A system as claimed in claim 1, wherein:
the controller further comprises communication means to communicate with a network other than the wireless ad-hoc peer-to-peer communication network.

10. A system as claimed in claim 1, wherein: some of the wireless routers are deployed outside of the structure.

11. A method for deployment within a three-dimensional structure having multiple levels, the method comprising:
deploying a plurality of wireless routers of a wireless ad-hoc peer-to-peer communication network including deploying a plurality of vertical routers for vertical communication among at least one set of vertical routers within the three-dimensional structure, and deploying a plurality of horizontal routers for horizontal communication among at least one set of horizontal routers within the three-dimensional structure;
deploying a plurality of mobile wireless terminals of the wireless ad-hoc multi-hopping and peer-to-peer communication network in the structure;
deploying at least one access point for providing the wireless routers and mobile wireless terminals communication access to a controller;
controlling each of the mobile wireless terminals to exchange signals with any of the routers within its broadcast range and, based on those signals, to determine its respective location in the structure and to provide location data to the controller via at least one said wireless router and said at least one access point; and
operating the controller to access a database including structure layout data pertaining to the structure and, based on the received location data and structure layout data, to generate information representing the respective locations of the mobile wireless terminals in the structure.

12. A method as claimed in claim 11, wherein:
the controller operating step generates the information as a display illustrating the layout of the structure and the respective locations of the mobile wireless terminals on the layout display.

13. A method as claimed in claim 11, further comprising the steps of:
providing to the controller router location data from the wireless routers and access point location information from the at least one access point, and operating the controller to include information representing respective locations of the wireless routers and said at least one access point in the generated information.

14. A method as claimed in claim 11, wherein:
the access point deploying step deploys a plurality of said access points; and
wherein the structure is a multi-floor building, and the wireless routers are deployed during the wireless router deploying step with one or more of the vertical routers being in substantial vertical alignment at openings in the floors to provide communication between one or more horizontal routers on the floors and the access points.

15. A method as claimed in claim 11, further comprising the step of:
operating the controller to access the database for updated structure layout data pertaining to the structure, and to generate the information based on the received location data and the updated structure layout data.

16. A method as claimed in claim 11, wherein the mobile wireless terminal controlling step includes controlling each of the mobile wireless terminals to perform ranging calculations based on the exchange signals with any of the routers within its broadcast range and determine its respective location based on those ranging calculations.

17. A method as claimed in claim 11, further comprising the step of:
controlling each of the mobile wireless terminals to communicate at least one of voice, video and data information for receipt by the controller via at least one wireless router and said at least one access point.

18. A method as claimed in claim 11, further comprising the step of:
coupling a mobile controller to the controller to receive the generated information from the controller.

19. A method as claimed in claim 11, further comprising the step of:
operating the controller to communicate with a network other than the wireless ad-hoc peer-to-peer communication network.

20. A method as claimed in claim 11, wherein:
the wireless router deploying step deploys some of the wireless routers outside of the structure.

21. A communication network for use within a multiple floor building, the communication network comprising:
a plurality of vertical routers vertically communicatively coupled to each other for providing communication between the multiple floors;
a plurality of horizontal routers comprising one or more sets of horizontal routers located on each floor of the multiple floor building, wherein each set of horizontal routers on each floor are horizontally communicatively coupled to each other for providing communication within the floor, wherein each set of horizontal routers on each floor includes at least one horizontal router communicatively coupled to at least one vertical router;
a local control for maintaining location and performance information about each of the plurality of vertical routers and each of the plurality of horizontal routers, wherein the local control communicates the location and performance information to a main control;
one or more mobile terminals, wherein each mobile terminal is communicatively coupled to at least one router of the plurality of vertical routers and the plurality of horizontal routers, wherein the at least one router provides a location reference for computing a location position of the mobile terminal, and further wherein the at least one router relays communication data to the main control; and
the main control for managing communication of the network.

22. A communication network as claimed in claim 21, comprising a pre-deployed system and a deployed system, wherein:
the pre-deployed network comprises the plurality of vertical routers, the plurality of horizontal routers, and the local control; and
the deployed network comprises the one or more mobile terminals and the main control.

23. A communication network as claimed in claim 22, wherein the pre-deployed system comprises a stationary system of fixed devices.

24. A communication network as claimed in claim 22, wherein the deployed system comprises an ad hoc system of mobile devices deployed in response to an event within the multiple floor building.

25. A communication network as claimed in claim 21, wherein the main control communication management comprises coordinating access to communication channels within the network and computing a location position of each mobile terminal and each router within the network.

26. A communication network as claimed in claim 21, wherein each of the routers includes one or more sensors, wherein each of the mobile terminals is operated by an emergency team member, and further wherein the main control communication management comprises one or more operations selected from a group of operations comprising identify one or more hot spots in the multiple floor building by querying one or more sensors, identifying a position of each emergency team member, providing one or more voice connections between the emergency team members, providing voice directions to one or more emergency team members, reading one or more vital signs of the emergency team members, distributing information to other devices about the emergency team members, and identifying safe evacuation routes for the emergency team members.

27. A communication network as claimed in claim 22, wherein the main control is communicatively coupled to the deployed system through one or more connections selected from a connection group comprising a wired Ethernet Backbone, a wireless connection to the plurality of horizontal routers, a wireless connection to the plurality of vertical routers, a router installed on an aircraft located above the multiple floor building, and a communication connection through a neighboring building.

28. A communication network as claimed in claim 27, wherein the main control selects one or more connections providing a highest throughput.

29. A process for deployment of a communication network within a multiple floor building, the process comprising:
a construction phase for installing stationary devices for establishing a fixed communication network within the multiple floor building;
an operation phase for installing one or more mobile terminals and a main control, each of the one or more mobile terminals and the main control communicatively coupled to the stationary devices, the operation phase comprising managing communication and tracking of the mobile terminals by the main control using data about the mobile terminals and about the stationary devices received from the stationary devices:
an installation phase for loading into the local control:
a routers database including the position of each of the horizontal routers and the vertical routers, and
one or more building maps including any communication confinements; and
a testing phase for checking the correctness of the database stored within the local control including conducting a test comprising:
moving a mobile terminal across each floor of the building,
observing the position of the mobile terminal on a portable computer with the floor map and recording position corrections of the mobile terminal,
the local control recording a log of mobile terminal computed locations and the horizontal routers used for computing these locations, and
conducting new tests in the location where any router has not been used in previous tests.

30. A process of deployment of a communication network within a multiple floor building as claimed in claim 29, wherein the construction phase comprises:
installing a plurality of vertical routers comprising one or more sets of vertical routers, wherein each set of vertical routers includes communicatively coupled vertical routers within a vertical shaft;
installing a plurality of horizontal routers comprising one or more sets of horizontal routers, wherein each set of horizontal routers includes communicatively coupled horizontal routers within a floor, wherein each set of horizontal routers on each floor includes at least one horizontal router communicatively coupled to at least one vertical router;
installing at least one intelligent access router at an end of each vertical shaft to provide communication through the floors; and
installing a local control communicatively coupled to the at least one intelligent access routers.

31. A process of deployment of a communication network within a multiple floor building as claimed in claim 30, wherein the operating phase further comprises:
the local control collecting one or more data selected from a group of data including range data, voice data, and direction data from each mobile terminal in and around the building and transmitting the collected data to the main control for processing.

32. A process of deployment of a communication network within a multiple floor building as claimed in claim 31, wherein the operating phase further comprises:
the main control displaying one or more views of the mobile terminals including one or more maps of the floors of the building in which the mobile terminals are operating.

33. A process of deployment of a communication network within a multiple floor building as claimed in claim 31, wherein the operating phase further comprises:
each mobile terminal calculating its respective location using one or more data selected from a group of data including time of flight data and received signal strength indicator data, and providing the calculated respective location to one or more of the horizontal routers and the vertical routers.

34. A process of deployment of a communication network within a multiple floor building as claimed in claim 30 further comprising;
a pre-operation phase for communicatively coupling the main control to the local control, and for downloading the building databases from the local control to the main control.

* * * * *